P. VAN AFFAIRE.
DOCK.
APPLICATION FILED APR. 22, 1918.
1,398,825.
Patented Nov. 29, 1921.
2 SHEETS—SHEET 1.
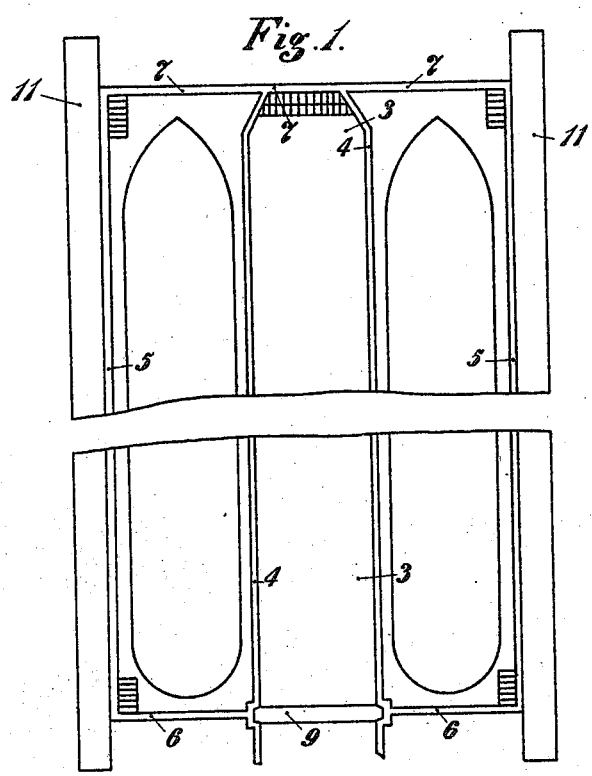
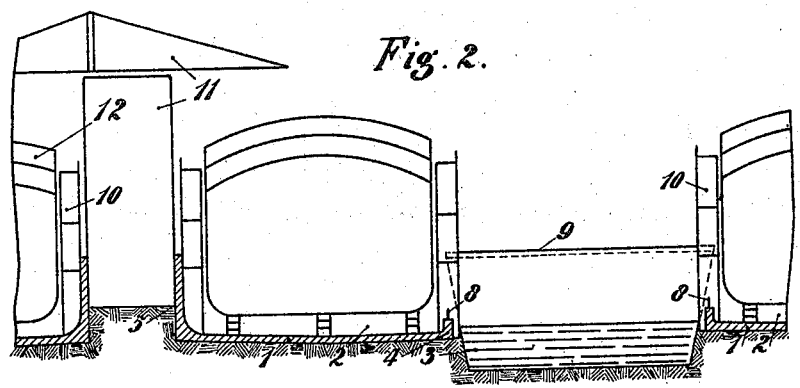

P. VAN AFFAIRE.
DOCK.
APPLICATION FILED APR. 22, 1918.
1,398,825.
Patented Nov. 29, 1921.
2 SHEETS—SHEET 2.
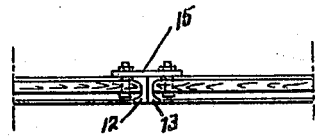
Fig.5.
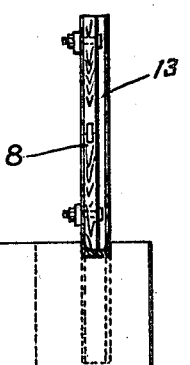
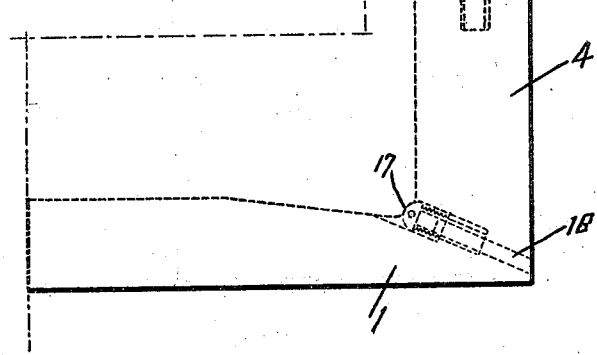
Fig.3.
Fig.4.
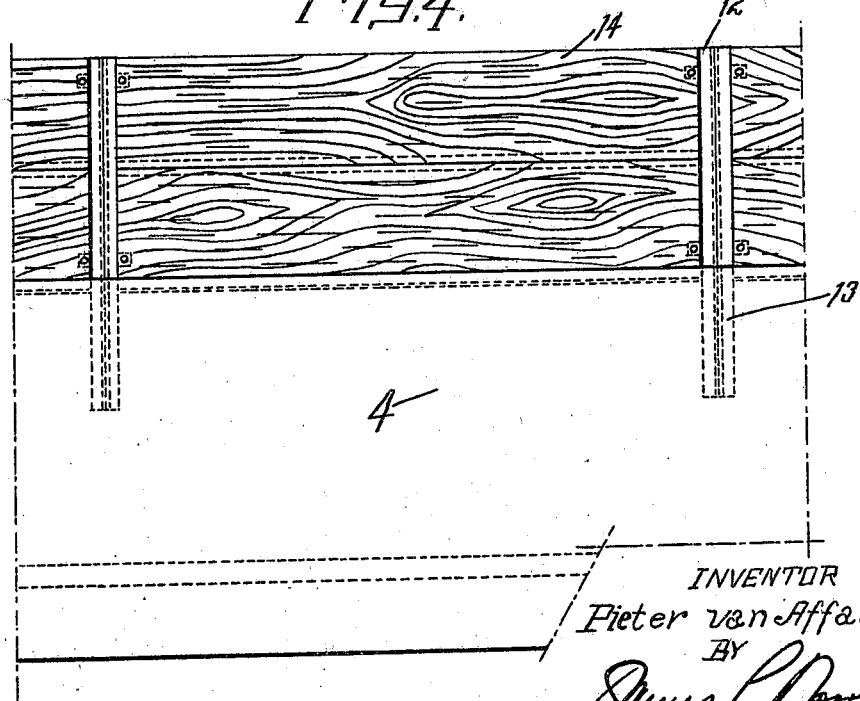
INVENTOR
Pieter van Affaire
BY
ATTORNEY

UNITED STATES PATENT OFFICE.

PIETER VAN AFFAIRE, OF ROTTERDAM, NETHERLANDS, ASSIGNOR TO NAAMLOOZE VENNOOTSCHAP WILTON'S MASCHINEFABRIEKEN SCHEEPSWERF, OF ROTTERDAM, NETHERLANDS, A LIMITED LIABILITY COMPANY OF NETHERLANDS.

DOCK.

1,398,825.   Specification of Letters Patent.   Patented Nov. 29, 1921.

Application filed April 22, 1918. Serial No. 230,160.

*To all whom it may concern:*

Be it known that I, PIETER VAN AFFAIRE, naval architect, a subject of the Queen of the Netherlands, residing at Rotterdam, in the Province of South Holland, in the Kingdom of the Netherlands, have invented certain new and useful Improvements in Docks, of which the following is a specification.

The invention relates to improvements in docks in which ships are put upon the stocks, built, and, after having been finished, launched in the dock itself.

A dock of this kind usually comprises an excavation adjacent the body of water into which the vessel is to be launched which excavation is kept closed at the water side by means of suitable lock gates during the time that the ship is being built.

As soon as the ship is finished water is admitted into the dock till the ship begins to float, and the water level in said dock becomes even to that of the water outside. The gates are then opened and the ship allowed to float out of the dock.

A dock of this type requires an excavation of a depth below water level at least equal to the maximum draft of an empty ship usually amounting to about 5 meters, and also requires very strong and bulky lock gates which can hardly be kept watertight.

For these reasons a dock of this kind is not suitable for use in countries such as the Netherlands, where the nature of the soil is such that it does not allow deep excavation or which making of such a deep dock must be avoided as being too costly.

The object of the present invention is to provide a dock which has all the advantages of the well known deep docks for building vessels, but in which the floor of the dock may be approximately at low water level, or so much lower as the soil will allow and which will permit the vessel to be launched in the dock itself.

To this end the invention contemplates the provision of a dock arranged alongside of and offset from a small basin which is closed from the main body of water by means of a suitable lock gate and which basin is also separated from the dock by a low wall or partition the height of which above the floor of the dock amounts to a little less than the normal height of the under side of the keel of a ship on the stocks above the floor of the dock.

The remaining part of the dock is surrounded by a partition wall the maximum height of which above the floor of the dock amounts to about the maximum draft of the empty ship plus the height of the stocks, for example, about 5M+1.5 M=6.5 meters. The depth of the adjoining basin is at high water level about 5.5 meters—viz, or somewhat more than the maximum draft of the empty vessel—while the top of the closed lock gate is substantially at the same level as the top of the high partition wall which surrounds the dock and the basin. The dock is disposed with its length or major dimension substantially parallel to the length or major dimension of the basin.

Now if a ship built in a dock constructed and arranged as heretofore described is to be launched, the adjoining basin is closed from the outside water by closing the lock gate. Water is then pumped into the said basin, from which it will overflow the intervening low partition wall into the dock, until the vessel begins to float.

When the vessel is so floated its keel will be at a level a little above the top of the low wall between the dock and the basin and can be floated over this wall into the basin. The water is thereupon drawn from the latter until its level becomes even to that of the water outside, and if the lock gate is then opened the ship can be floated from the basin into the main body of water.

The depth of the basin at the stage of the tide at which launching is to take place, usually high tide, will preferably be only slightly greater than the draft of the empty vessel, so that the launching of vessels of the maximum draft must take place at such tide stage.

A dock according to the invention is shown on the accompanying drawings, in which :—

Figure 1 is a plan view of two adjacent docks with one basin arranged between them; and Fig. 2 is a cross section on a larger scale, of one complete dock and basin, portions of two other adjacent docks being also shown.

Fig. 3 is a detail view showing in cross section the removable bulwark and drain conduit.

Fig. 4 is a front elevation of a portion of the removable bulwark.

Fig. 5 is a plan view showing the abutting ends of adjoining pannels of the bulwark.

The floors 1 of both docks 2 are or may be substantially at water level, or as much lower as the nature of the local soil will allow. The waterlevel in the basin 3, shown on the drawing corresponds to said low water level.

The depth of the basin itself is preferably about 4 meters. The docks are separated from the basin by a low partition wall 4, the top of which is about 1 meter above the floor of the dock upon which are placed the usual stocks.

In case the floor of the dock is at low water level, a watertight bulwark or flashboard 8 of about 1.2 meters in height is arranged on the top of this wall 4. This bulwark is removed when the ship is launched. It is put on the wall so as to enable the lock gate to be kept open during all the time that the vessel is being built except when spring tides occur, and prevents the overflow of water into the dock on account of waves or high tide. The basin is thus accessible for the supply of materials and floating cranes operating in the basin may be used in connection with the building of the vessel.

The means for securing the removable bulwark in position is shown in figures 3, 4 and 5 and comprises a groove formed by a channel iron embedded longitudinally in the top of the wall 4 with pairs of vertical channel bars 12 and 13 arranged back to back and removably held in sockets formed in said wall. Within the open top frame formed by the longitudinal channel irons and the oppositely facing vertical channel bars is slid the board panel 14 which is secured to the adjacent panel by means of the strap iron 15 bolted to the two panels.

The floor of the dock is preferably given a transverse slope, toward the middle, about 20 c. m. and a longitudinal slope of about 30 c. m., so that rainwater will flow to and be collected at one point thus keeping the floor of the dock dry.

The long side 5 of each dock one short side or end 6 thereof and the other short side or end 7 together with the corresponding short side or end of the basin are formed by a high partition wall, the height of which above the floor of the dock, or above low water level, may amount to about 6.5 meters, assuming 5 meters to be the maximum draft of the empty vessel. The lock gate 9 preferably of the floating type, is arranged between the forward partition walls 6, its top being at the level of the tops of the walls 6 when said gate is closed.

The numeral 10 represents scaffolding which is arranged alongside each ship, while 11 represents a traveling crane which may be used for serving two vessels under construction.

If a vessel built in a dock constructed in accordance with this invention is to be launched, the bulwark 8 is removed, the lock gate 9 is closed, and the water level in the basin is raised by pumping, until it flows over into the dock and rises in the same until the ship begins to float.

The maximum depth of water then amounts, in the example under consideration, to about 6.5 meters in the dock and to 10.5 meters in the basin. The keel of the ship is then free to pass over the top of the partition 4, so that the vessel can be floated into the basin, whereupon, the water is drawn off from the latter until the water level therein becomes even to that in the river or other body into which the vessel is to be launched, thus leaving a depth in the basin of about 5.5 meters, and leaving the keel of a vessel of maximum draft about 0.5 meters clear from the bottom of the basin. On removing or opening this lock gate the vessel can be floated into the main body of water. Apertures, which are normally closed by means of suitable closures 17 are arranged in the low partition walls 4, so as to enable the water to flow back again from the dock into the basin at low water. If at the time of launching a ship in one dock a ship 12 is being built in another dock communicating with the same basin openings must be left free in its hull, so as to prevent it from being floated at the same time.

It will be understood that in case the dock according to this invention is to be built at a riverside with practically no tides, the partition wall 4 at the side of the harbor may be dispensed with or be made very low.

The great advantages of a dock constructed in accordance with this invention, are that its floor can be laid on low water level, tide-water level, or as low as the nature of the soil will allow; so that while retaining all advantages resulting from building ships in docks in which they may be launched no difficult and costly excavations, which are almost impracticable in a country with a soft soil, are necessary and the building and launching of a ship into a river or other body of water is greatly facilitated by the arrangement of the basin alongside the dock or where a plurality of docks are employed between two adjacent docks.

What I claim is:

1. The combination with a dock having a floor disposed approximately at low water level, of a basin arranged alongside of and offset from said dock with its major dimension substantially parallel to the major dimension of said dock, a wall forming an exterior closure for said dock and one end of said basin, a lock gate located at the other end of said basin for controlling communication between the main body of water and said basin, a low partition separating said dock and basin, a removable bulwark superimposed on said wall of such height as to permit the lock gate to be normally in open position, the height of said wall above the floor of said dock being at least equal to the maximum draft of the empty ship plus a distance greater than the height of said partition to allow a clearance for the keel of the ship in passing over said partition.

2. The combination with a dock having a floor disposed approximately at water level, of a basin arranged alongside and offset from said dock with its major dimension substantially parallel to the major dimension of said dock, a high wall forming an exterior closure for said dock and one end of said basin, a lock gate for controlling communication between the main body of water and said basin, a low partition separating said dock and basin and means for varying the height of said partition whereby said lock gate may be normally maintained in open position and the keel of the ship within the dock may pass safely over said partition into the basin.

In testimony whereof I have hereunto set my hand.

PIETER van AFFAIRE.